ic Office 2,837,552
Patented June 3, 1958

2,837,552

CLEAVAGE OF SILICON-TO-SILICON AND SILOXANE LINKAGES

Philip D. George and Arthur E. Newkirk, Schenectady, N. Y., assignors to General Electric Company, a corporation of New York No Drawing. Application December 20, 1954
Serial No. 476,544

19 Claims. (Cl. 260—448.8)

This invention relates to processes for breaking silicon-to-silicon linkages and Si—O—Si linkages, and to certain novel products made thereby.

In the commercial manufacture of organic silicon compounds such as alkylhalogenosilanes, certain side reactions take place which produce compounds containing silicon-to-silicon linkages and Si—O—Si linkages which will be hereafter referred to as siloxane linkages. The term "siloxane linkages" is used herein to mean only Si-O-Si linkages. These compounds constitute a substantial fraction of the total reaction products and accordingly over a period of time relatively large quantities are produced. Cleavage of these compounds containing silicon-to-silicon linkages and Si—O—Si linkages produce products which are more valuable commercially than the starting compounds.

For example, in manufacturing methylchlorosilanes, side reactions take place which produce compounds containing silicon-to-silicon linkages and in the chlorination of silicon or ferrosilicon side reactions take place which produce siloxane linkages. Cleavage of these linkages to form monosilanes produce products which are more valuable commercially than the compounds containing the silicon-to-silicon linkages and the siloxane linkages.

The compounds containing the silicon-to-silicon linkages and the siloxane linkages often have halogen atoms, such as chlorine atoms, attached to the silicon atoms forming the linkages. It should be advantageous to replace these chlorine atoms in the same reaction which produces cleavage of the silicon-to-silicon linkages and the siloxane linkages.

Accordingly, it is an important object of the present invention to provide a new process for breaking silicon-to-silicon linkages and siloxane linkages.

Another object of the invention is to provide a process of breaking silicon-to-silicon linkages and siloxane linkages with an arylol compound and substituting an aryloxy group on one of the solution atoms at the point of cleavage of the linkage.

Still another object of the invention is to provide a process of breaking silicon-to-silicon linkages and the siloxane linkages with phenol and substituting a phenoxy group on at least one of the silicon atoms at the point of cleavage.

Yet another object of the invention is to provide a process of breaking silicon-to-silicon linkages and siloxane linkages in compounds having a halogen atom on at least one of the silicon atoms forming the linkage, the halogen atom being replaced during cleavage of the linkage with the cleavage agent.

Still another object of the invention is to provide a process of breaking silicon-to-silicon linkages and siloxane linkages in compounds having a chlorine atom attached to at least one of the silicon atoms forming the linkage, the breaking of the linkage being brought about by means of a phenol, a phenoxy group being substituted on one of the silicon atoms at the point of cleavage and also being substituted for the chlorine atom.

A further object of the invention is to produce new chemical compounds as a result of the cleavage of silicon-to-silicon bonds and siloxane bonds.

A still further object of the invention is to provide two new chemical compounds, namely, dimethyldiphenoxysilane and methyltriphenoxysilane.

It has been found that these objects and advantages of the invention are realized by treating compounds having silicon-to-silicon linkages and siloxane linkages with arylol compounds. As used herein, the term "arylol" compounds includes aromatic compounds having attached thereto on an aromatic ring a reactive hydroxyl group and the term "aryloxy" compounds includes arylol compounds in which the hydrogen atom has been removed from the reactive hydroxyl group. A preferred class of arylol compounds are the phenols, such as phenol, the cresols, chlorophenols, the bromophenols, the nitrophenols, and other related compounds. Other more complicated arylol compounds, such as naphthols, may be used. The compounds preferred for use in the present invention are monohydric phenols free of substituent groups which are reactive toward chlorosilanes. Phenol will be used in the following description as an example of a suitable arylol compound for use in the present invention.

By means of this process the silicon-to-silicon linkages and the siloxane linkages are broken and in certain instances an aryloxy group is substituted at the point of cleavage. In addition if the compound containing the silicon-to-silicon bond or the compound containing the silixone bond has a halogen atom attached to the one of the silicon atoms in the split bond, an aryloxy group is substituted for the halogen atom. In general, the process of the present invention produces aryloxysilanes. If phenol is the arylol compound used to effect cleavage, the resultant product will be a phenoxysilane and if one or more halogen radicals are attached to the silicon adjacent the split bond, a diphenoxysilane, a triphenoxysilane or a tetraphenoxysilane is formed. More particularly, if the cleavage product is a monosilane, the resultant product will be phenyl orthosilicate when the silicon atom before cleavage has three halogen radicals attached thereto.

Certain of the starting compounds used in the present invention also may have alkyl groups attached to the silicon atoms adjacent the silicon-to-silicon linkage or the siloxane linkage that is broken. In such cases the product will be an alkylaryloxysilane. More particularly, when the arylol compound is phenol, the cleavage product will be an alkylphenoxysilane. In such compounds the silicon may also have one or more halogen radicals attached thereto as well as alkyl groups in which case the halogen radicals are also replaced by aryloxy groups to form alkyldiaryloxy- and alkyltriaryloxysilanes.

This invention has particular application to by-products obtained from the "direct process" manufacture of methylchlorosilanes. These by-products contain silicon-to-silicon linkages. Examples of such compounds are methylchlorodisilanes including methylpentachlorodisilane, dimethyltetrachlorodisilanes, trimethyltrichlorodisilanes, tetramethyldichlorodisilanes, and the various isomers thereof. A typical by-product including a siloxane linkage resulting from the chlorination of silicon or ferrosilicon is hexachlorodisiloxane.

In general the process of the present invention comprises mixing the compounds including the silicon-to-silicon linkages and the siloxane linkages with a suitable arylol compound and heating the mixture under reflux conditions at an elevated temperature. The specific temperature and the period of heating chosen would depend upon the starting materials and the arylol compound chosen. In general the temperature of the reaction mixture is raised from about 200° C. to about 300° C. over a period of from two to six hours as determined and permitted by the rate of refluxing. The products may be purified by distillation and/or recrystallization. In order to illustrate further the present invention, the following examples are given. It is to be understood that these examples are not to be considered as limiting the scope of the present invention.

*Example 1*

434 grams, 4.6 moles, of phenol were reacted with 298 grams of still residue obtained from the "direct process" manufacture of methylchlorosilanes. The still residue contained 50.3% hydrolyzable chlorine and included a mixture of the various isomers of methylpentachlorodisilane, dimethyltetrachlorodisilanes, trimethyltrichlorodisilanes, and tetramethyldichlorodisilanes. The phenol and the still residues were reacted in a round-bottom flask fitted with a dropping funnel, a thermometer well and a tap water-cooled reflux condenser surmounted by a Dry Ice-trichloroethylene cold finger from which an exit line leads through a drying tube and a water scrubber to the atmosphere. The phenol was first placed in the flask and heated until molten. The chlorosilicon compounds (the still residues) were added gradually to the molten phenol and then the temperature of the reaction mixture was raised to 300° C. over a period of 1.5 hours. The reaction was considered complete when the hydrogen chloride evolution had ceased and the theoretical weight loss had been attained. Two major products were obtained by distillation. The first major product weighed 91 grams and boiled at 198–204° C. at 100 mm. Hg pressure. The second major product weighed 276 grams and boiled in the range from 267–271° C. at 100 mm. Hg pressure. No higher boiling materials were obtained. The first or lower boiling point product was identified as being preponderantly dimethyldiphenoxysilane which has the empirical formula $(CH_3)_2Si(OC_6H_5)_2$. The second or higher boiling point product was identified as being preponderantly methyltriphenoxysilane which has the empirical formula $(CH_3)Si(OC_6H_5)_3$. Each of the products was contaminated with silicon hydrides as was qualitatively determined by the ability of the products to reduce permanganate solution.

It is thought that the splitting of the silicon-to-silicon bond as described in Example 1 above proceeds according to the following set of reactions but the inventors do not wish to be bound by the proposed mechanism:

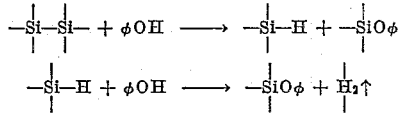

If the silicon compound has halogen radicals, for example, chlorine radicals, attached thereto, these radicals are replaced by phenoxy radicals in this reaction. For example, it is believed that the reaction with dimethyltetrachlorodisilane proceeds as follows:

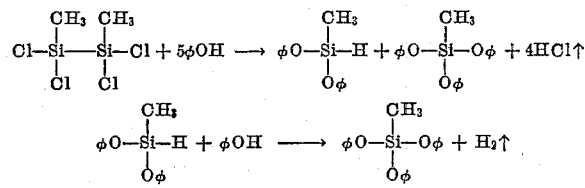

In general the present process is useful in forming alkyltriphenoxysilane when the starting material contains a silicon-to-silicon bond in which one of the silicon atoms has attached thereto an alkyl group and two halogen atoms, such as chlorine atoms. On the other hand, if the silicon atom forming the silicon-to-silicon bond has two alkyl groups and one chlorine atom attached thereto, the product will be dialkyldiphenoxysilane. If the alkyl group is a methyl group, the products formed will be methyltriphenoxysilane and dimethyldiphenoxysilane.

Dimethyldiphenoxysilane is useful as a hydraulic fluid. Methyltriphenoxysilane is useful as a dielectric fluid.

*Example 2*

A fraction of the still residue employed as a starting material in Example 1 was subjected to fractionation to obtain substantially a crude mixture of dimethyltetrachlorodisilanes. The selected fraction was the 40% of the total residue which boiled at 152° C. to 160° C. and contained 60% hydrolyzable chlorine. 306 grams of the selected fraction were reacted with 546 grams, 5.8 moles, of phenol in the same apparatus and substantially the same manner as described above with respect to Example 1. The temperature of the reaction mixture was raised to 250° C. over a period of 3 hours. The product obtained was a clear liquid. Upon standing, the product deposited a white solid which upon recrystallization from n-heptane gave 85 grams of halogen-free, silicon-containing white crystals having a constant melting point at 65° C. This material has certain of the characteristics of hexamethylcyclotrisiloxane but the sublimation characteristics seemed to differ.

The liquid phase of the cleavage product gave upon fractional distillation 58 grams of dimethyldiphenoxysilane having the following physical characteristics: B. P. 202–209° C. at 100 mm. Hg pressure; $n^{20}_D$ 1.5345. The major product from the fractional distillation was 292 grams of methyltriphenoxysilane containing some silicon hydrides as indicated by the reduction of potassium permanganate and of silver nitrate. This major product had the following physical characteristics: B. P. 273–276° C. at 100 mm. Hg pressure; $n^{20}_D$ 1.5500–97. The remainder of the crude product appeared as fractional distillation foreshot 63 grams, interfractions 63 grams and residue 45 grams.

The following is an example of the cleavage of a siloxane linkage according to the present invention in which hexachlorodisiloxane is used as a starting material for the reaction and in which phenol is used as the cleavage agent.

*Example 3*

An apparatus of the type described above in Example 1 was provided and 200 grams, 2.13 moles, of phenol were placed in the flask and heated until molten. There was then gradually added to the molten phenol 101 grams, 0.35 mole, of hexachlorodisiloxane. After the addition of the hexachlorodisiloxane, the temperature of the reaction mass was raised to 300° C. over a period of 4.5 hours, as permitted by the rate of refluxing. The resultant product was a dark brown, viscous liquid. Distillation of the product resulted in the isolation of 163 grams of reddish yellow solid which boiled at 220–65° C. at 1 mm. Hg pressure and melted at 48–51° C. Recrystallization of the solid from heptane gave light yellow crystals of phenyl orthosilicate which melted and mixed melted at 53–4° C. The yield of phenyl orthosilicate was 77% based on phenol which was the limiting reagent. The product is useful as a high temperature heat transfer fluid.

The method described above in Example 3 is equally applicable to other siloxane linkages and may be used on siloxane compounds which have substituted thereon other constituents besides chlorine atoms. For example, the process is applicable to siloxane compounds in which the silicon has attached thereto various alkyl groups, substituted alkyl groups, or other halogen atoms. Whenever a halogen atom is attached to one of the silicon atoms forming the split bond, the halogen atom is replaced by a phenoxy group.

One of the new products of this invention, namely, methyltriphenoxysilane, can also be prepared in good yields by the following process.

*Example 4*

There was added to the flask of the equipment described in Example 1, 441 grams, 4.70 moles, of phenol. The phenol was melted and to the molten phenol was added gradually 232 grams, 1.55 moles, of methyltrichlorosilane. The reaction mixture was heated at reflux temperature for six hours. Methyltriphenoxysilane was recovered in a 71% yield. The properties of the product were as follows: B. 275° C. at 100 mm. Hg pressure, $n^{20}_D$ 1.5599, $d^{20}_{1.135}$, $\eta$ 7.39 (100° F.), $\eta$ 1.99 (210° F.), ASTM pour point −55° C., flash point 196° C., fire point 226° C. It was calculated that the carbon and hydrogen analysis for the empirical formula $C_{19}H_{18}O_3Si$ would be C, 70.8 and H, 5.6. Other calculated properties are: molecular weight 322.4; $R_D$ 0.2835. It was found that the product as made above in Example 4 contained 70.5% carbon by weight and contained 5.5% hydrogen by weight. The following properties were also determined: molecular weight (three determinations) 307, 314, 325: $R_D$ 0.2849.

The new compound dimethyldiphenoxysilane can be obtained in good yields by the following process.

*Example 5*

There was added gradually to the flask of the equipment described in Example 1 above, 385 grams, 4.10 moles, of phenol. The phenol was melted and to the molten phenol was added gradually 265 grams, 2.04 moles of dimethyldichlorosilane. The reaction mixture was heated at reflux temperature for six hours. Dimethyldiphenoxysilane was recovered from the reaction mixture in a 67% yield. The physical properties of the dimethyldiphenoxysilane so prepared were as follows: B. 206° C. at 100 mm. Hg pressure, $n^{20}_D$ 1.5335, $d^{20}_{1.063}$, $\eta$ 3.73 (100° F.), $\eta$ 1.18 (210° F.), ASTM pour point −57° C., flash point 130° C., fire point 165° C. The calculated analysis of carbon and hydrogen based on the empirical formula $C_{14}H_{16}O_2Si$ was carbon 68.7% and hydrogen 6.6%. The following properties of such a compound also calculated were: molecular weight 244.4; $R_D$ 0.2906. By actual determination it was found that the carbon content of the product obtained in Example 5 was 68.9% by weight and the hydrogen content was 6.8% by weight. The following properties were also determined experimentally on the product of Example 4: molecular weight (two trials) 240 and 241; $R_D$ 0.2922.

The methods and products described above fulfill all of the objects and advantages set forth herein. There have been provided suitable processes for splitting silicon-to-silicon linkages and siloxane linkages using arylol compounds. More specifically, there has been provided a process for splitting silicon-to-silicon linkages and siloxane linkages in which phenol is used as the cleavage agent, a phenoxy group being substituted at the point of cleavage. In those cases in which a halogen and more particularly a chlorine atom was attached to the silicon in the linkages, the halogen atom has been replaced by an aryloxy or phenoxy group depending upon what compound was used to effect cleavage of the silicon-to-silicon linkage or the siloxane linkage. In addition there have been provided as new compounds alkyltriphenoxysilane and dialkyldiphenoxysilane, the products in the cases in which the alkyl group is a methyl group being methyltriphenoxysilane and dimethyldiphenoxysilane.

Although certain specific examples and conditions have been given for purposes of illustration, it is to be understood that various changes and modifications can be made therein without departing from the spirit and scope of the invention. Accordingly, the invention is to be limited only as set forth in the following claims.

What we claim as new and desire to secure by Letters Patent of the United States is:

1. The method of making monosilanes comprising adding compounds of the class consisting of compounds containing a silicon-to-silicon linkage and compounds containing a siloxane linkage to a melted arylol compound, heating the mixture to split the linkage, and separating monosilanes from the reaction mass.

2. The method of making monosilanes comprising adding compounds of the class consisting of compounds containing a silicon-to-silicon linkage and compounds containing a siloxane linkage to a melted arylol compound, heating the mixture so formed to an elevated temperature to split the linkage, and separating monosilanes from the reaction mass.

3. The method of making monosilanes comprising adding compounds of the class consisting of compounds containing a silicon-to-silicon linkage and compounds containing a siloxane linkage to a melted arylol compound, heating the mixture so formed to a temperature above 200° C. to split the linkage, and separating monosilanes from the reaction mass.

4. The method of making monosilanes comprising adding compounds of the class consisting of compounds containing a silicon-to-silicon linkage and compounds containing a siloxane linkage to a melted arylol compound, heating the mixture under reflux conditions and elevating the temperature to above 200° C. over a period from about two to about six hours to split the linkage, and separating monosilanes from the reaction mass.

5. The method of making monosilanes comprising melting an arylol compound, adding a compound of the class consisting of compounds containing a silicon-to-silicon linkage and compounds containing a siloxane linkage to the melted arylol compound, heating the reaction mixture to a temperature of about 200° C., and separating monosilanes from the reaction mass.

6. The method of making monosilanes comprising adding compounds of the class consisting of compounds containing a silicon-to-silicon linkage and compounds containing a siloxane linkage to molten phenol, heating the mixture so formed to an elevated temperature to split the linkage, and separating monosilanes from the reaction mass.

7. The method of making monosilanes comprising melting a quantity of phenol, adding a compound of the class consisting of compounds containing a silicon-to-silicon linkage and compounds containing a siloxane linkage to the melted phenol, heating the resultant mixture to a temperature of about 200° C., and separating monosilanes from the resultant mixture.

8. The method of making monosilanes comprising adding a compound of a class consisting of compounds containing a silicon-to-silicon linkage and compounds containing a siloxane linkage in which at least one of the silicons of the linkages is at least partially halogenated to a melted arylol compound, heating the mixture to split such linkages and to substitute aryloxy groups on the silicon atoms of such linkages at the point of splitting and to replace any halogen atoms thereon, and separating monosilanes from the reaction mass.

9. The method of making monosilanes comprising adding a compound of the class consisting of compounds containing a silicon-to-silicon linkage and compounds containing a siloxane linkage in which at least one of the silicons of the linkages is at least partially chlorinated to molten phenols, heating the mixture to split such linkages and to substitute phenoxy groups on the silicon atoms of such linkages at the point of splitting and to replace with phenoxy groups any chlorine atoms thereon, and separating monosilanes from the reaction mass.

10. The method of making monosilanes comprising adding a compound containing a silicon-to-silicon linkage to a melted arylol compound, heating the mixture to split the linkage, and separating monosilanes from the reaction mass.

11. The method of making monosilanes comprising gradually adding a compound containing a silicon-to-silicon linkage to a melted arylol compound, heating the mixture so formed to a temperature above 200° C., and separating monosilanes from the reaction mass.

12. The method of making monosilanes comprising gradually adding a compound containing a silicon-to-silicon linkage to molten phenol, heating the mixture to an elevated temperature to split the linkage, and separating monosilanes from the reaction mass.

13. The method of making monosilanes comprising gradually adding a methylchlorodisilane to a melted arylol compound, heating the mixture to an elevated temperature to split the silicon-to-silicon linkage therein and to substitute aryloxy groups on the silicon atoms of the linkage at the point of splitting and to replace the chlorine atoms thereon, and thereafter separating monosilanes from the reaction mass.

14. The method of making monosilanes comprising gradually adding a methylchlorodisilane to molten phenol, heating the mixture at an elevated temperature to split the silicon-to-silicon linkage therein and to substitute phenoxy groups on the silicon atoms at the point of splitting and to replace the chlorine atoms with phenoxy groups, and thereafter separating the phenoxy substituted monosilanes from the reaction mass.

15. The method of making monosilanes comprising adding a compound containing a siloxane linkage to a melted arylol compound, heating the mixture to split the linkage, and separating monosilanes from the reaction mass.

16. The method of making monosilanes comprising adding a compound containing a siloxane linkage to a melted arylol compound, heating the mixture so formed to a temperature above 200° C., and separating monosilanes from the reaction mass.

17. The method of making monosilanes comprising adding a compound containing a siloxane linkage to molten phenol, heating the mixture to split the linkage, and separating monosilanes from the reaction mass.

18. The method of making monosilanes comprising gradually adding hexachlorodisiloxane to a melted arylol compound, heating the mixture to split the siloxane linkage and to substitute aryloxy groups on the silicon atoms at the point of splitting and to replace the chlorine atoms with aryloxy groups, and thereafter separating the aryloxy substituted monosilanes from the reaction mass.

19. The method of making monosilanes comprising gradually adding hexachlorodisiloxane to molten phenol, heating the mixture at an elevated temperature to split the siloxane linkages and to substitute phenoxy groups on the silicon atoms at the point of splitting and to replace the chlorine atoms with phenoxy groups, and thereafter separating the phenoxy substituted monosilanes from the reaction mass.

References Cited in the file of this patent

UNITED STATES PATENTS

| | | |
|---|---|---|
| Re. 23,274 | Morrill | Sept. 26, 1950 |
| 2,386,793 | Hanford | Oct. 16, 1945 |
| 2,485,366 | Di Giorgio | Oct. 18, 1949 |
| 2,612,511 | Orkin | Sept. 30, 1952 |
| 2,626,957 | Orkin | Jan. 27, 1953 |
| 2,658,908 | Nitzsche et al. | Nov. 10, 1953 |
| 2,746,982 | Hyde | May 22, 1956 |